United States Patent
Hada

(10) Patent No.: US 11,816,862 B2
(45) Date of Patent: Nov. 14, 2023

(54) VEHICLE DISPLAY DEVICE

(71) Applicant: NIPPON SEIKI CO., LTD., Niigata (JP)

(72) Inventor: Makoto Hada, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 17/796,967

(22) PCT Filed: Feb. 24, 2021

(86) PCT No.: PCT/JP2021/006796
§ 371 (c)(1),
(2) Date: Aug. 2, 2022

(87) PCT Pub. No.: WO2021/172333
PCT Pub. Date: Sep. 2, 2021

(65) Prior Publication Data
US 2023/0054971 A1    Feb. 23, 2023

(30) Foreign Application Priority Data

Feb. 28, 2020  (JP) ................................. 2020-032500

(51) Int. Cl.
*G06T 7/73* (2017.01)
*G02B 27/01* (2006.01)
(Continued)

(52) U.S. Cl.
CPC ............ *G06T 7/73* (2017.01); *G02B 27/0101* (2013.01); *G02B 27/0179* (2013.01);
(Continued)

(58) Field of Classification Search
CPC ............ G06T 7/73; G06T 2207/30201; G02B 27/0101; G02B 27/0179;
(Continued)

(56) References Cited

U.S. PATENT DOCUMENTS 6,327,522 B1    12/2001  Kojima et al.
8,708,498 B2 *   4/2014  Sasaki .................... G06V 40/19
                                                       353/13

(Continued)

FOREIGN PATENT DOCUMENTS

JP    2001-71843 A    3/2001
JP    2008-126984 A   6/2008
(Continued)

OTHER PUBLICATIONS

International Search Report issued in corresponding International Application No. PCT/JP2021/006796, dated May 18, 2021, w/ English Translation (6 pages).

*Primary Examiner* — Brent D Castiaux
(74) *Attorney, Agent, or Firm* — McDermott Will & Emery LLP

(57) ABSTRACT

A head-up display device as a vehicle display device projects display light onto a front windshield of a vehicle, displays a virtual image by reflected display light, on the front windshield, so as to be superimposed on a real scene transparent through the front windshield, captures an image of a driver of the vehicle by projecting infrared light onto the driver, and detects the positions of the eyes of the driver based on the captured image. A control unit detects the position of a feature point of the face of the driver in the captured image and stores a positional relationship with the detected positions of the eyes, and, when it is difficult to detect the positions of the eyes in die captured image, estimates a viewpoint position of the driver based on the position of the feature point detected at this time and the positional relationship stored beforehand.

3 Claims, 5 Drawing Sheets

(51) Int. Cl.
*G09G 3/00* (2006.01)
*B60K 35/00* (2006.01)

(52) U.S. Cl.
CPC .............. *G09G 3/002* (2013.01); *B60K 35/00* (2013.01); *B60K 2370/1529* (2019.05); *B60K 2370/21* (2019.05); *B60K 2370/23* (2019.05); *B60K 2370/741* (2019.05); *G02B 2027/0138* (2013.01); *G02B 2027/0181* (2013.01); *G06T 2207/30201* (2013.01); *G09G 2380/10* (2013.01)

(58) Field of Classification Search
CPC .... G02B 2027/0138; G02B 2027/0181; G09G 3/002; G09G 2380/10; B60K 35/00; B60K 2370/1529; B60K 2370/21; B60K 2370/23; B60K 2370/741
See application file for complete search history.

(56) References Cited

U.S. PATENT DOCUMENTS

| | | | |
|---|---|---|---|
| 10,860,093 B1* | 12/2020 | Chang | G06F 3/012 |
| 2010/0067118 A1* | 3/2010 | Takahashi | G02B 27/01 |
| | | | 359/633 |

FOREIGN PATENT DOCUMENTS

| | | | |
|---|---|---|---|
| JP | 2010-58633 A | | 3/2010 |
| JP | 2011-152883 A | | 8/2011 |
| JP | 2012-163613 A | | 8/2012 |
| JP | 2019-206262 A | | 12/2019 |
| KR | 10-2013-0068732 A | | 6/2013 |
| KR | 20130068732 A | * | 6/2013 |

* cited by examiner

VEHICLE DISPLAY DEVICE

CROSS REFERENCE TO RELATED APPLICATIONS

This application is the U.S. National Phase under 35 U.S.C. § 371 of International Application No. PCT/JP2021/006796, filed on Feb. 24, 2021, which claims the benefit of Japanese Application No. 2020-032500, filed on Feb. 28, 2020, the entire contents of each are hereby incorporated by reference.

TECHNICAL FIELD

The present invention relates to a vehicle display device, such as a head-up display device, which displays a virtual image on a front windshield of a vehicle or a combiner, etc., and can also detect the positions of the user's eyes.

BACKGROUND ART

A head-up display device, which generates a virtual image by display light reflected by a reflective light-transmissive member such as a front windshield of a vehicle or a combiner, and displays the virtual image to be superimposed on the actual view (scenery ahead of the vehicle), which is seen transparently through the reflective light-transmissive member, contributes to safe and comfortable vehicle operation by providing information desired by a user, e.g., a driver of the vehicle, by means of the virtual image, while suppressing movement of a line of sight of the user as much as possible.

Also, the head-up display device includes ones which irradiate the user with infrared light to capture an image of the user, and detect the positions of the user's eyes (the positions of the pupils) on the basis of the captured image, thereby serving to grasp the state of the user such as the action of looking aside and a doze.

For example, a head-up display device described in Patent Literature 1 is configured to reflect visible light, which is emitted from a display means, toward the user by a combiner member, thereby forming an image of a display image. The above head-up display device is provided with: an infrared ray irradiation means for irradiating infrared rays toward the user; a mirror member which reflects the visible light emitted from the display means toward the combiner member and allows the infrared rays reflected by the user and the combiner member to pass therethrough; a plurality of image-capturing means for sensing the infrared rays that have passed through the mirror member and capturing images of the user from different directions, respectively; and an image processing means for calculating the positions of the user's eyes on the basis of the images captured by the image-capturing means. The head-up display device is thereby enabled to accurately calculate the positions of the user's eyes.

PRIOR ART DOCUMENT

Patent Document

Patent Literature 1: JP 2008-126984 A

SUMMARY OF THE INVENTION

Problems to be Solved by the Invention

Incidentally, when strong external light such as sunlight or streetlight light enters the head-up display device, there arises a problem in which external light noise is added to a captured image, and detection of the positions of the user's eyes fails. In the head-up display device described in Patent Literature 1, when an infrared component of the external light enters the image-capturing means as it passes through the mirror member, a noise area having blown out highlights due to saturation or the like is formed in the captured image. This noise area may interfere with the detection of the positions of the eyes even if the noise area does not necessarily overlap with the positions of the user's eyes (the position of an image of the eyes) in the captured image.

The present invention has been conceived in view of the above circumstances, and an object of the present invention is to provide a vehicle display device capable of stably detecting the positions of the user's eyes even when external light is incident.

Solution to Problem

In order to solve the above problem, the present invention provides a vehicle display device, which projects display light onto a reflective light-transmissive member provided in a vehicle, generates a virtual image by the display light reflected by the reflective light-transmissive member and displays the virtual image to be superimposed on an actual view, which is seen transparently through the reflective light-transmissive member, and also projects infrared light onto a user of the vehicle to capture an image of the user, thereby enabling detection of a viewpoint position of the user on the basis of the captured image, in which the vehicle display device includes: an eye detection means that detects a position of an eye of the user in the captured image; a viewpoint position detection means that detects the viewpoint position on the basis of the position of the eye detected by the eye detection means; a feature point detection means that detects a position of a feature point of the user in the captured image; and a storage means that stores a positional relationship between the position of the eye detected by the eye detection means and the position of the feature point detected by the feature point detection means. The present invention is characterized in that the viewpoint position detection means estimates, when it is difficult to detect the position of the eye by the eye detection means, the viewpoint position based on the position of the feature point detected by the feature point detection means, and the positional relationship stored in the storage means. In the above, "when it is difficult to detect the position of the eye by the eye detection means" refers not only to the case where the eye detection means fails to detect the position of the eye, but also the case where a predetermined condition in which detection of the position of the eye is considered to be difficult due to incidence of external light, etc., is satisfied.

Also, the vehicle display device according to the present invention further includes a face direction detection means that detects a direction of a face of the user, and the viewpoint position detection means may estimate the viewpoint position on the basis of the direction of the face detected by the face direction detection means.

The eye detection means may detect the positions of left and right eyes of the user in the captured image obtained by regular or irregular image capturing during the display of the virtual image, and the storage means may store the positional relationship obtained from the captured image of the time when a separated distance between the left and right eyes is maximized on or after a predetermined reference time.

Alternatively, the vehicle display device according to the present invention further includes a line-of-sight information acquisition means that acquires line-of-sight information of the user, in which the eye detection means may detect the position of the eye in the captured image obtained by regular or irregular image capturing during the display of the virtual image; and the storage means may store the positional relationship obtained from the captured image of the time when the user is facing the front, on the basis of the line-of-sight information acquired by the line-of-sight information acquisition means. In the above, "time when the user is facing the front" means the time when the user is oriented in a direction in which an image of the user is captured, and refers not only to the case where the user's face or line of sight is strictly oriented in an image-capturing direction, but also the case where a predetermined condition in which the face or the line of sight is considered to be oriented in the image-capturing direction is satisfied.

Effect of the Invention

According to the vehicle display device of the present invention, it is possible to stably detect the positions of the user's eyes even when external light is incident.

MODE FOR CARRYING OUT THE INVENTION

Figure 1:
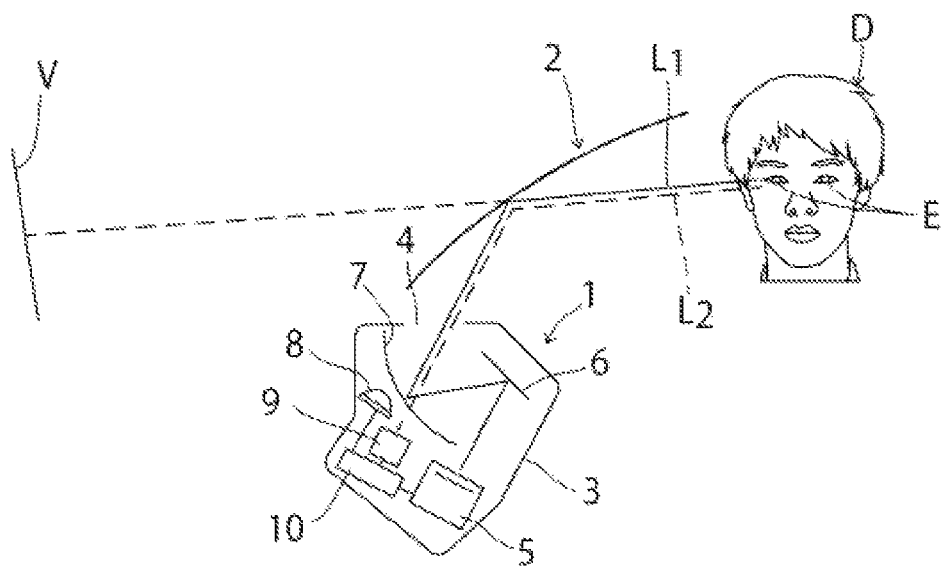
FIG. 1 is an explanatory diagram illustrating a head-up display device according to an embodiment for carrying out the invention.

Embodiments for carrying out the present invention will be described by referring to the drawings.

As shown in FIG. 1, a head-up display device (HUD) 1, as a vehicle display device (in-vehicle display unit) according to the present embodiment, is provided below a front windshield 2 of a vehicle, and projects display light $L_1$, which is visible light, onto one part of the front windshield 2. The display light $L_1$ is reflected by the front windshield 2 to generate a virtual image V, and allows a driver D of the vehicle to visually recognize the virtual image V to be superimposed on the actual view, which is seen transparently through the front windshield 2.

The HUD 1 also has the function of a Driver Monitoring System (DMS) which monitors the state of the driver D. The HUD 1 projects infrared light $L_2$ onto the driver D to capture an image of the driver D, and is capable of detecting the positions of the eyes E of the driver D on the basis of the captured image.

Specifically, the HUD 1 is covered with a housing 3, which is formed of a black ABS resin or the like to prevent external light from entering inside, and is delimited from the outside. On the housing 3, a light-transmissive part 4 covered with a transparent resin such as polycarbonate, which is not illustrated, is formed. Inside the housing 3, a display unit 5, a turn back mirror 6, a concave mirror 7, an infrared light irradiation unit 8, a camera 9, and a control unit 10 are held and accommodated.

In this embodiment, the display unit 5 is provided with a light source configured from a chip-type light-emitting diode, and a liquid crystal panel. As the liquid crystal panel modulates emission light of the light source two-dimensionally, image light (display light $L_1$), which is visible light, is projected for display. Alternatively, a reflective device such as a Digital Micromirror Display (DMD) may be used. The turn back mirror 6 is made by depositing a metal, such as aluminum, on a resin such as polycarbonate formed to have a flat portion, and simply reflects light. The concave mirror 7 is made by depositing a metal, such as aluminum, on a resin such as polycarbonate formed to have a concave portion, and has the property of magnifying and reflecting visible light, and also allowing infrared light to pass therethrough.

The infrared light irradiation unit 8 is provided on the back side of the concave mirror 7 (i.e., on a side opposite to the light-transmissive part 4 and the turn back mirror 6 with respect to the concave mirror 7), and irradiates infrared light (near infrared rays) emitted by the light source, which is configured from the light-emitting diode, toward the concave mirror 7. The camera 9 is provided with an imaging element having sensitivity to infrared light of a wavelength range that is irradiated from the infrared light irradiation unit 8, and a lens that allows the infrared light to pass therethrough for image formation on the imaging element, and captures a near-infrared ray image.

The control unit 10 is configured from a microprocessor, a memory, various electronic components for operating the aforementioned elements, a substrate, and a case, and controls the display unit 5 so that an image from the HUD 1 is appropriately displayed on the basis of vehicle information and information input by the driver D.

Figure 2:
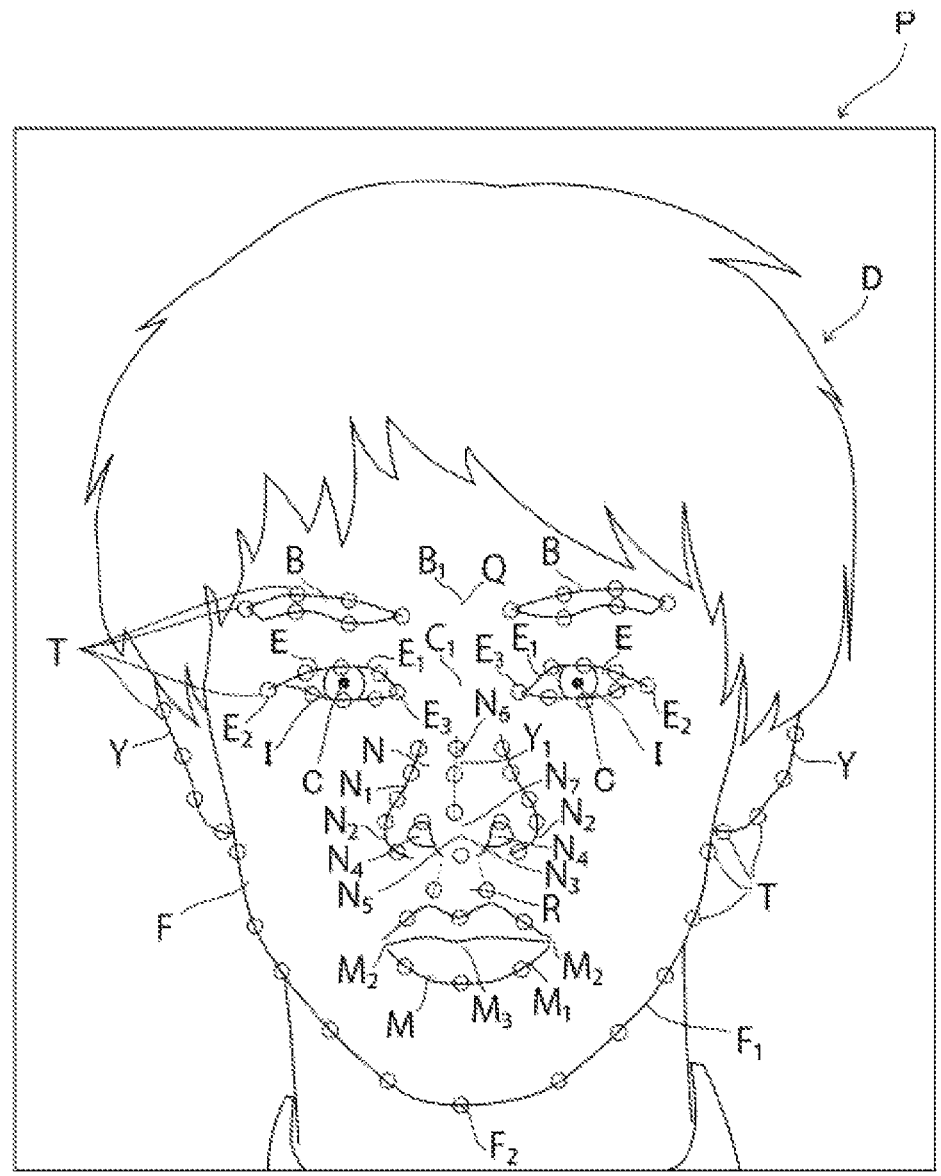
FIG. 2 is an explanatory diagram illustrating a captured image of a driver taken by the head-up display device of FIG. 1, together with feature points.

In addition, as shown in FIG. 2, the control unit 10 detects the position of a pupil C (or the center of an iris I) of the left and right eyes E of the driver D, on the basis of the contrast of a captured image P taken by the camera 9, and detects the position of a midpoint $C_1$ of these left and right pupils C as a viewpoint position. The detected viewpoint position can be used to detect the state of the driver D (e.g., the action of looking aside and a doze) and to control the display of the HUD 1.

Further, on the basis of the contrast of the captured image P taken by the camera 9, the control unit 10 detects the position of a feature point T such as an outline $F_1$ of a face F of the driver D (including a tip $F_2$ of a chin), left and right ears Y, a center Yi of the left and right ears Y, left and right eyebrows B, a center $B_1$ of the left and right eyebrows B, an area Q between the eyebrows, an outline $E_1$ of the left and right eyes E (including an outer corner $E_2$ of the eye and an inner corner $E_3$ of the eye), an outline $N_1$ of a nose N (including an edge $N_2$ of the nose on each of the left and right sides), a center $N_3$ of the edges $N_2$ of the nose, left and right nostrils $N_4$, a center $N_5$ of the left and right nostrils $N_4$, a bridge $N_6$ of the nose, a nasal apex $N_7$, a philtrum R, an outline $M_1$ of a mouth M (including left and right corners $M_2$ of the mouth), and a center $M_3$ of the left and right corners $M_2$ of the mouth. In addition to the above, the control unit 10 stores, in an internal memory, a positional relationship between the detected position of the pupil C and the detected position of each of the feature points T. (A captured image to be used for acquisition of the positional relationship stored in the control unit 10 will be hereinafter referred to as a "reference image".)

In the HUD 1, the display light $L_1$ from the display unit 5 is reflected by the turn back mirror 6, then magnified and reflected by the concave mirror 7, and projected onto the front windshield 2 by passing through the light-transmissive part 4. The display light $L_1$ projected onto the front windshield 2 is magnified and reflected toward the driver D side, and generates the virtual image V, which is displayed to the driver D to be superimposed on the actual view, which is seen transparently through the front windshield 2.

Meanwhile, the infrared light $L_2$ from the infrared light irradiation unit 8 passes through the concave mirror 7, passes through the light-transmissive part 4 and is projected onto the front windshield 2, and is reflected by the front windshield 2 toward the driver D side and irradiates the driver D. Further, when the infrared light $L_2$ is reflected by the driver D, part of the infrared light $L_2$ follows the opposite path, and an image of the driver D is captured by the infrared light $L_2$ having passed through the concave mirror 7 and incident on the camera 9. The captured image P is input to the control unit 10. Such image capturing is performed regularly or irregularly during display of the virtual image V. Here, moving-image-capturing at a regular frame rate is performed while the virtual image V is being displayed.

Figure 3:
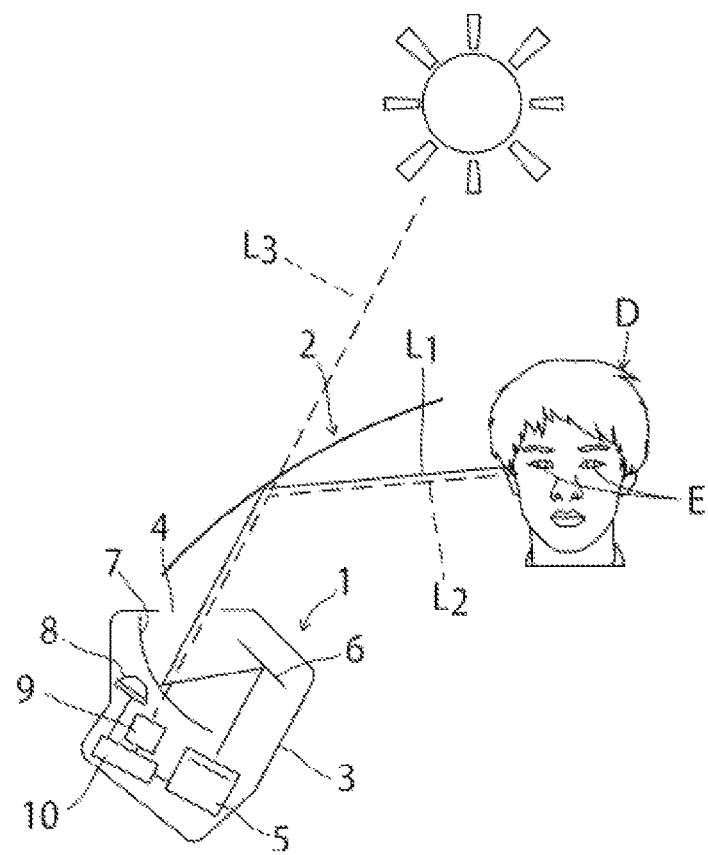
FIG. 3 is an explanatory diagram illustrating the state in which external light enters the head-up display device of FIG. 1.
Figure 4:
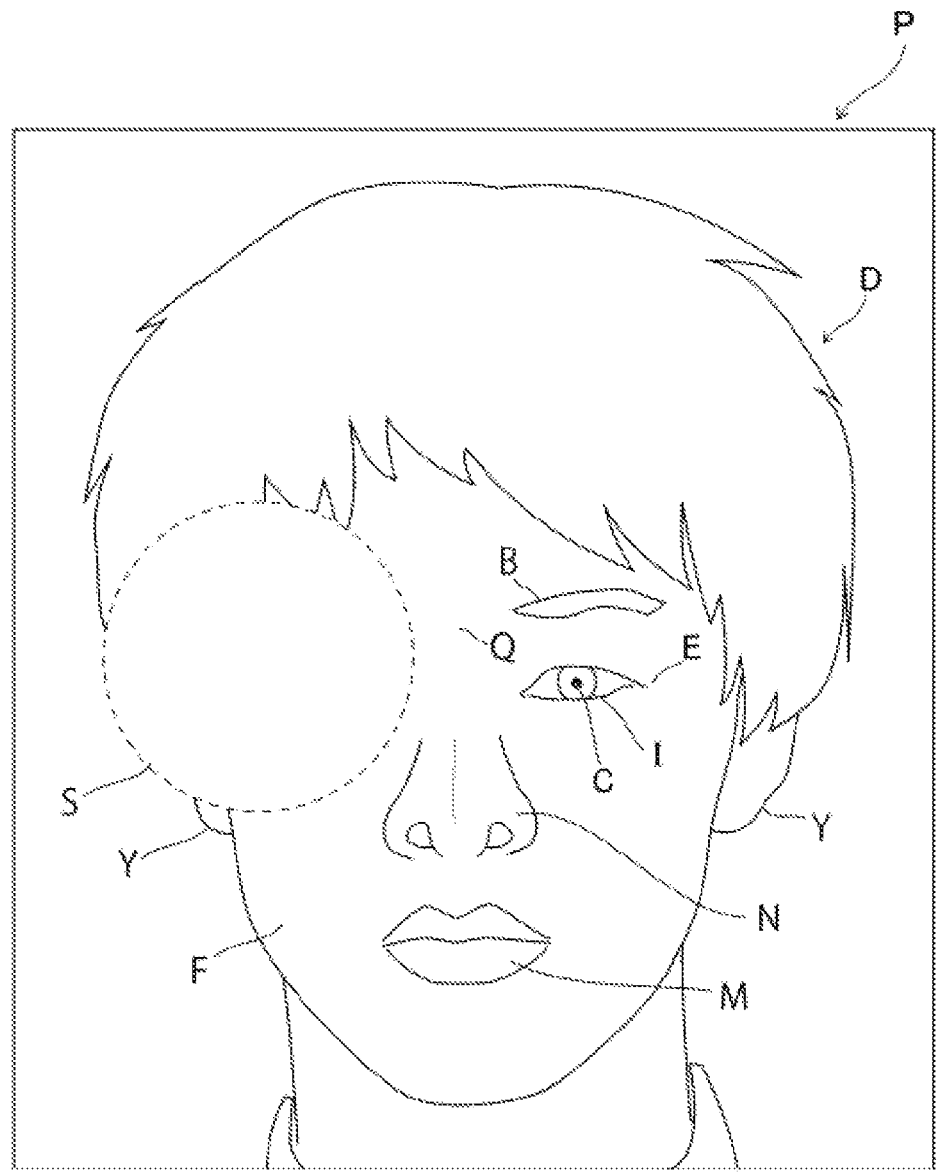
FIG. 4 is an explanatory diagram illustrating a captured image including a noise area caused by external light.

When the captured image P of the driver D is input, the control unit 10 detects the positions of the pupils C of the left and right eyes E of the driver D, and detects the position of the midpoint $C_1$ of these left and right pupils C as the viewpoint position. Essentially, the captured image P of the driver as shown in FIG. 2 is to be obtained. However, as shown in FIG. 3, when an infrared component of strong external light $L_3$, such as sunlight, passes through the front windshield 2, the light-transmissive part 4, and the concave mirror 7, and is made incident on the camera 9, a noise area S having blown out highlights, as shown in FIG. 4, is generated in the captured image P, and a trouble may occur in detection of the position of the eyes E (the right eye E in FIG. 4) of the driver D.

Therefore, the control unit 10 acquires a positional relationship between the position of the pupil C and the position of the feature point T from the captured image P which has been taken normally in advance (i.e., in a state where the face F is not hidden by the noise area 5), and stores the positional relationship. Further, when it is difficult to detect the position of the pupil C due to the presence of the noise area S in the captured image taken afterward, the control unit 10 estimates the positions of the left and right pupils C, and moreover, the viewpoint position (the position of the midpoint $C_1$), on the basis of the position of the feature point T detected from that captured image P, and the above-mentioned positional relationship stored in advance.

In the HUD 1 of the present embodiment, the control unit 10 detects the positions of the eyes E (pupils C) of the driver D in the captured image P, and detects the viewpoint position on the basis of the detected positions of the eyes E. Further, the control unit 10 detects the position of the feature point T (preferably, the positions of a plurality of feature points T) of the face F of the driver D in the captured image P (reference image), and stores the positional relationship between the detected positions of the eyes E and the detected position of the feature point T. By doing so, when it is difficult to detect the positions of the eyes E, the viewpoint position is estimated on the basis of the position of the feature point T detected then and the positional relationship stored in advance.

Therefore, even when it is difficult to detect the position of one of or both of the left and right eyes E due to the influence of the external light $L_3$, the positions of the eyes E can be estimated if the position of the feature point T can be obtained by the image capturing. Thus, the probability of failure in detecting the positions of the eye E is reduced, and it becomes possible to stably detect the positions of the eyes E even when the external light $L_3$ is incident.

Since the image capturing of the driver D is performed while the virtual image V is being displayed, it can be assumed that the driver D is oriented in a front direction of the vehicle (image-capturing direction of the camera 9) in an eyebox plane of the HUD 1, and is visually recognizing the virtual image V (otherwise, it would not be possible for the driver D to visually recognize the virtual image V). Meanwhile, the more the driver D is facing the front in the captured image P, which is used as the reference image, the higher the accuracy becomes to estimate the viewpoint position. For this reason, the accuracy of estimating the viewpoint position can be increased by performing the image capturing of the driver D while the virtual image V is being displayed.

If the captured image P in which the driver D is more certainly facing the front is assumed as the reference image, the control unit 10 may detect the positions of the left and right eyes E of the driver D in the captured image P, which is to be obtained by regular or irregular image capturing during the display of the virtual image V, and assume the captured image P of the time when a separated distance between the left and right eyes E (here, an interval between the left and right pupils C) is maximized on or after a predetermined reference time (which may be the point of time when the display of the virtual image V is started) as the reference image. By doing so, the control unit 10 may update the reference image, and calculate the positional relationship from that reference image and store the positional relationship.

In other words, the more the driver D is precisely facing the front, the greater the separated distance between the left and right eyes E becomes. Therefore, if the separated distance between the left and right eyes E in a newly taken captured image P is greater than the separated distance between the left and right eyes E in the captured image P which has been used as the reference image, that new captured image P should be used as the reference image to perform overwriting in the control unit 10 with the positional relationship obtained from the new captured image P By updating the positional relationship stored in the control unit 10, it becomes possible to accurately estimate the viewpoint position on the basis of the positional relationship under the circumstances where the driver D more certainly faces the front.

Alternatively, when the control unit 10 acquires information on a line of sight of the driver D on the basis of the captured image P, and it can be considered that the driver D is facing the front on the basis of the acquired line-of-sight information, the control unit 10 may assume the captured image P at that time as the reference image, and store the positional relationship obtained therefrom. By doing so, it becomes possible to accurately estimate the viewpoint position on the basis of the positional relationship under the circumstances where the driver D is more certainly facing the front. If the accuracy with which the driver D is facing the front in the reference image is to be increased, when it can be considered that the line of sight of the driver D in a newly taken captured image P is more directed to the front than the line of sight of the driver D in the captured image P used as the reference image of a certain point of time, that new captured image P may be used as the reference image to perform overwriting in the control unit 10 with the positional relationship obtained from the new captured image P The positional relationship stored in the control unit 10 may thereby be updated.

Also, the control unit 10 may detect the direction of the face F of the driver D from the positions of the feature points T in the captured image P, and estimate, when it is difficult to detect the position of one of or both of the left and right eyes E due to the influence of the external light $L_3$, the viewpoint position on the basis of the positions of the feature points T detected then, the positional relationship stored in advance, and the direction of the face F.

Figure 5A:
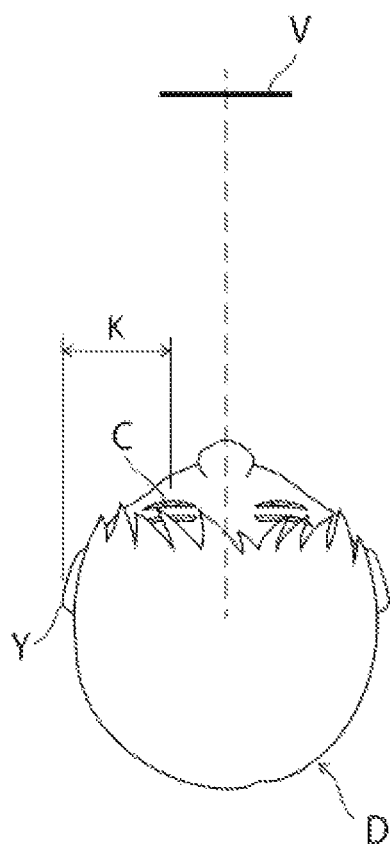
FIG. 5 (*a*) is an explanatory diagram illustrating, in a plan view, the state in which a driver is visually recognizing a virtual image and a face of the driver is directed to the front, and FIG. 5 (*b*) is an explanatory diagram illustrating, in a plan view, the state in which the driver's face is directed obliquely.
Figure 5B:
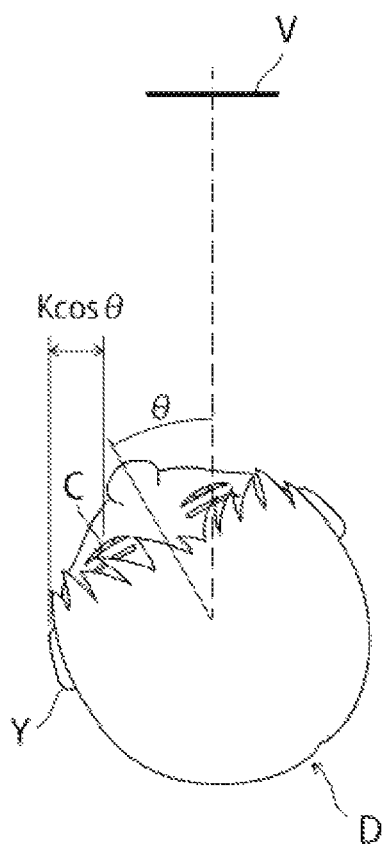

For example, there is a case where the control unit 10 stores a distance K between the pupil C and the ear Y as one of the positional relationships regarding the driver D, as shown in FIG. 5 (essentially, the positional relationship may be ascertained on the captured image P, but the distance between the pupil C and the ear Y of the driver D is indicated in FIG. 5 for convenience sake). In this case, when it is difficult to detect the positions of the eyes E, the viewpoint position is estimated by using the distance K, if the face F of the driver D is directed to the front (FIG. 5 (*a*)). Meanwhile, when it is difficult to detect the positions of the eyes E, if the face F of the driver D is directed obliquely at an angle θ (FIG. 5(*b*)), the viewpoint position is estimated by using a distance Kcosθ instead of the distance K. In other words, even when the left and right pupils C are at positions deviated from each other in a front-back direction (depth direction) of the vehicle, and a distance therebetween (inter-pupillary distance) is reduced in a left-right direction of the vehicle, it is possible to suppress a situation in which the accuracy of estimating the positions of the pupils C is lowered.

While embodiments for carrying out the present invention have been illustrated above, the embodiments of the present invention are not limited to those described above, and may be modified as appropriate without departing from the spirit of the invention.

For example, in the above embodiment, a front windshield of a vehicle has been used as the reflective light-transmissive member to project display light thereon, but a combiner may be used instead of the front windshield.

Also, for the estimation of the position of one of the left and right eyes E, the positional relationship obtained from the other one of the left and right eyes E may be used. That is, if the position of the pupil C of the right eye E cannot be acquired, but the positions of the outer corner $E_2$ of the eye and the inner corner $E_3$ of the eye of the same have been successfully acquired, and moreover, the positions of the pupil C of the left eye E, and the outer corner $E_2$ of the eye and the inner corner $E_3$ of the eye of the same have been successfully acquired, the position of the pupil C of the right eye E may be estimated on the basis of the positional relationship of the pupil C with the outer corner $E_2$ of the eye and the inner corner $E_3$ of the eye obtained for the left eye E, and the positions of the outer corner $E_2$ of the eye and the inner corner $E_3$ of the eye of the right eye E.

Furthermore, after the driver D has sat in a driver's seat of the vehicle, image capturing may be performed as calibration of the DMS in a state where the face F is directly facing the HUD display (virtual image V), and the captured image of this time may be used as the reference image.

DESCRIPTION OF REFERENCE NUMERALS

1 Head-up display device (vehicle display device)
2 Front windshield (reflective light-transmissive member)
9 Camera
10 Control unit (eye detection means, viewpoint position detection means, feature point detection means, storage means, face direction detection means, line-of-sight information acquisition means)
C Pupil
D Driver (user)
E Eyes
F Face
$L_1$ Display light
$L_2$ Infrared light
P Captured image
T Feature point
V Virtual image

The invention claimed is:

1. A vehicle display device, which projects display light onto a reflective light-transmissive member provided in a vehicle, generates a virtual image by the display light reflected by the reflective light-transmissive member and displays the virtual image to be superimposed on an actual view, which is seen transparently through the reflective light-transmissive member, and also projects infrared light onto a user of the vehicle to capture an image of the user, thereby enabling detection of a viewpoint position of the user based on the captured image, the vehicle display device comprising:

an eye detection means that detects a position of an eye of the user in the captured image;
    a viewpoint position detection means that detects the viewpoint position based on the position of the eye detected by the eye detection means;
    a feature point detection means that detects a position of a feature point of the user in the captured image; and
    a storage means that stores a positional relationship between the position of the eye detected by the eye detection means and the position of the feature point detected by the feature point detection means, wherein
    the viewpoint position detection means estimates, when it is difficult to detect the position of the eye by the eye detection means, the viewpoint position based on the position of the feature point detected by the feature point detection means, and the positional relationship stored in the storage means,
    the eye detection means detects positions of left and right eyes of the user in the captured image obtained by regular or irregular image capturing during the display of the virtual image, and
    the storage means stores the positional relationship obtained from the captured image of a time when a separated distance between the left and right eyes is maximized on or after a predetermined reference time.

2. The vehicle display device according to claim 1, further comprising a face direction detection means that detects a direction of a face of the user, wherein
    the viewpoint position detection means estimates the viewpoint position based on the direction of the face detected by the face direction detection means.

3. The vehicle display device according to claim 1, further comprising a line-of-sight information acquisition means that acquires line-of-sight information of the user, wherein:

the eye detection means detects the position of the eye in the captured image obtained by regular or irregular image capturing during the display of the virtual image; and the storage means stores the positional relationship obtained from the captured image of a time when the user is facing a front, based on the line-of-sight information acquired by the line-of-sight information acquisition means.

\* \* \* \* \*